UNITED STATES PATENT OFFICE.

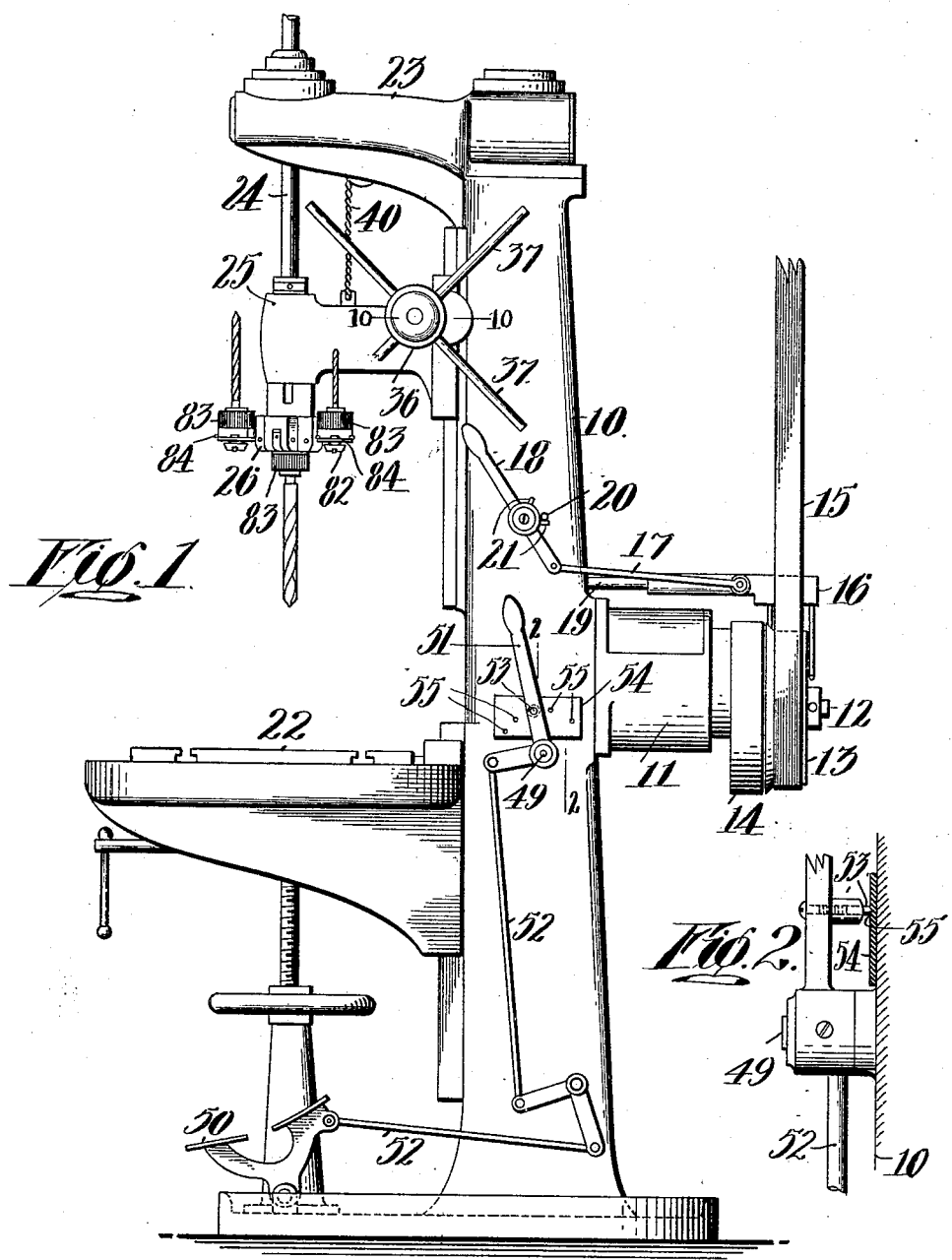

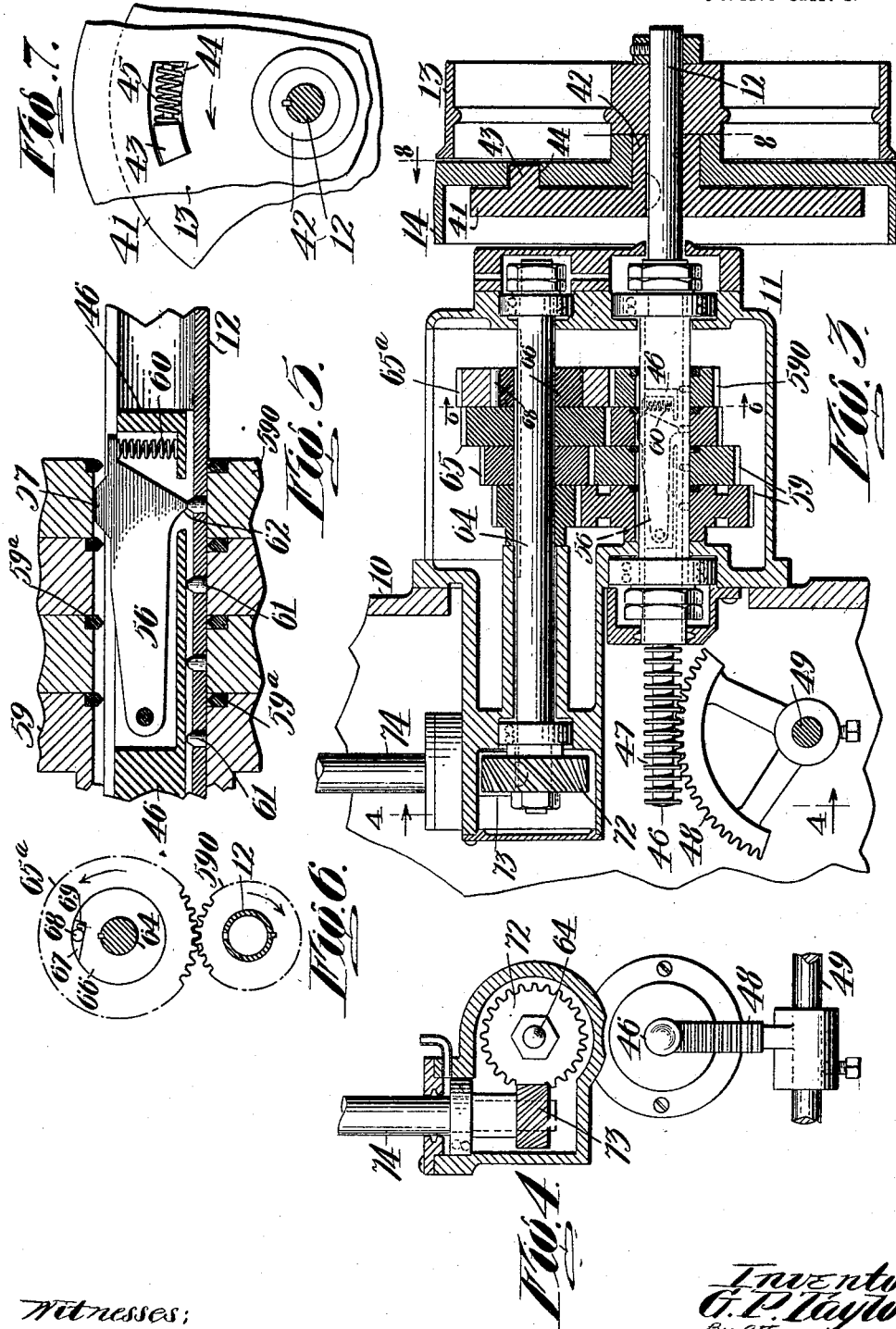

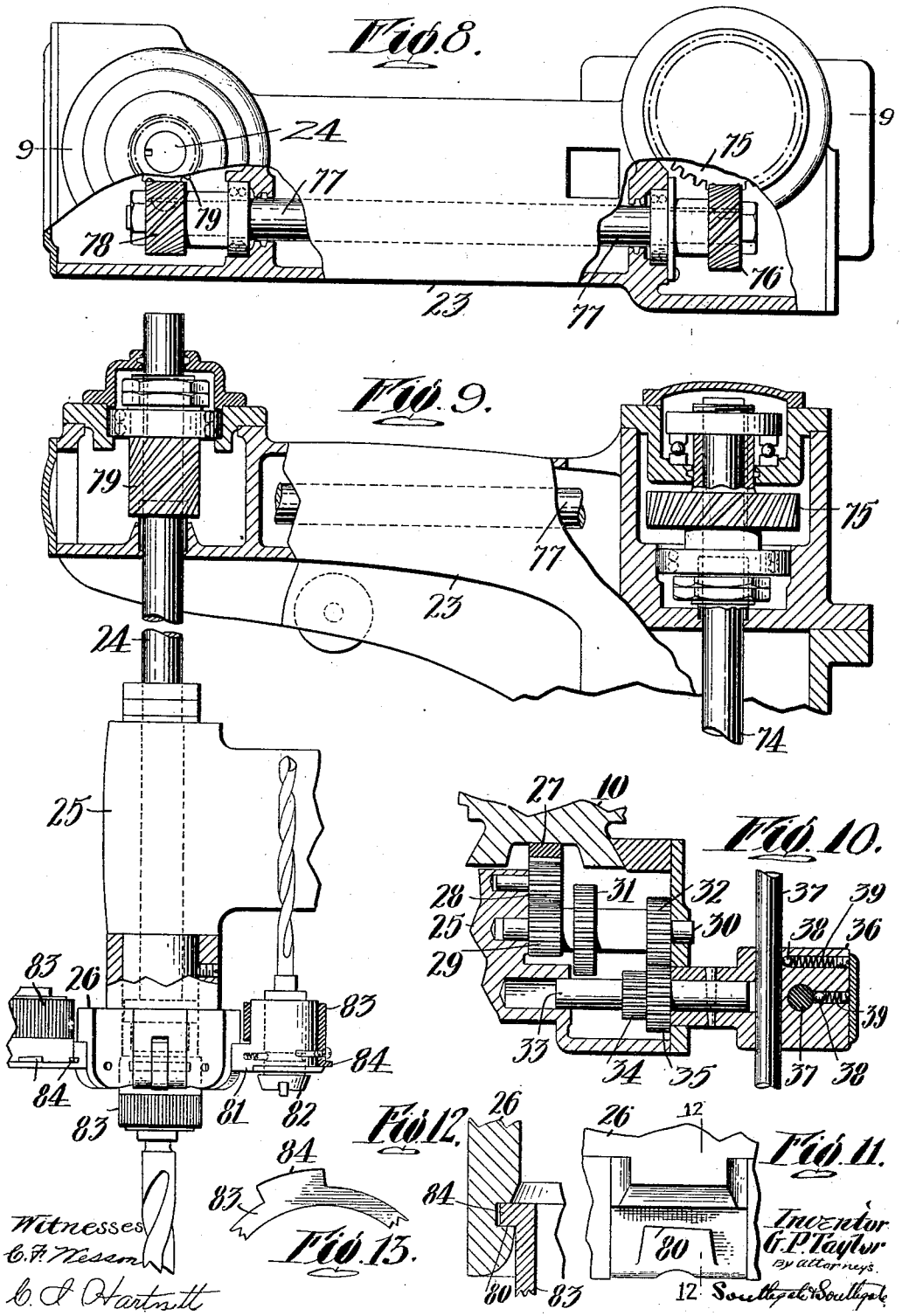

GEORGE P. TAYLOR, OF CLINTON, MASSACHUSETTS.

CHANGE-SPEED MECHANISM.

1,197,684.  Specification of Letters Patent.  Patented Sept. 12, 1916.

Application filed March 2, 1914. Serial No. 821,893.

*To all whom it may concern:*

Be it known that I, GEORGE P. TAYLOR, a citizen of the United States, residing at Clinton, in the county of Worcester and State of Massachusetts, have invented a new and useful Change-Speed Mechanism, of which the following is a specification.

Although many features of this invention are capable of general use, yet it is especially designed for use with a multiple drill such as that shown in my Patent No. 1,074,025, dated September 23, 1913. It will be understood that the use of drills of different sizes, taps, and other tools on the same head, results in necessitating a wide range of speed. According to the present invention, I have provided for getting this by means of an all-gear drive and at the same time have secured a drive for this purpose which is practically noiseless and does not produce appreciable vibrations even at the high speeds at which it is possible to run with this gearing and which is necessary in order to compete with modern machines of other types.

An ordinary device for connecting any one of a series of gears on a shaft with the shaft for changing the speed, is likely to be thrown out of connection when running at very high speeds; and one of the objects of this invention is to provide efficient and extremely simple means for positively preventing this.

Another feature of the invention consists in the provision of means whereby the changes in speed can be made without transmitting the sudden shock to the tool or to any part of the driving mechanism beyond the pulley for receiving the power from the main belt.

The invention also involves means whereby the machine can be made ordinarily for use either as a drill or tapping machine and yet the tapping connections which are necessary can be omitted without changing the design, simply by eliminating one pair of gears.

It may be considered that one of the most important objects of the invention is to combine certain of these features so that a practical still-running and efficient machine of this type is produced capable of operating at a very high speed.

Further objects and advantages of the invention will appear hereinafter.

Reference is to be had to the accompanying drawings in which—

Figure 1 is a side elevation of an upright drilling and tapping machine constructed in accordance with this invention; Fig. 2 is a sectional view of a detail on the line 2—2 of Fig. 1 on enlarged scale; Fig. 3 is an enlarged sectional view of the change speed mechanism, driving pulley and connected parts on a central vertical plane; Fig. 4 is a sectional view of the same on the line 4—4 of Fig. 3; Fig. 5 is an enlarged sectional view of the means for locking the several gears to the power shaft; Fig. 6 is a sectional view partially diagrammatic in form on the line 6—6 of Fig. 3 to show the type of gearing as used for a drill alone; Fig. 7 is a sectional view on the line 8—8 of Fig. 3; Fig. 8 is a plan of the transmission mechanism and the drill spindle with parts broken away and shown in section. Fig. 9 is a sectional view of the same on the line 9—9 of Fig. 8; Fig. 10 is a sectional view on the line 10—10 of Fig. 1 showing the mechanism for raising and lowering the head; Fig. 11 is a side elevation on enlarged scale of one of the multiple drill sockets; Fig. 12 is a sectional view on line 12—12 of Fig. 11; and Fig. 13 is a plan of one of the cam fastening devices.

The invention is shown as applied to an upright drill having a main frame 10. This is provided with a change speed gear box 11 from the end of which extends the main power shaft 12 provided with a loose pulley 13 and a driving pulley 14 for receiving the driving belt 15. The belt is shifted back and forth by a belt shifter 16 connected by a link 17 with a lever 18. The extent of motion of this shifter which is guided on a stationary rod 19 is limited by a pin 20 on the frame 10 which engages, at the extremes of motion, a pair of pins 21 on the lever 18.

On the frame 10 is the usual table 22 for holding the work which will not be described as it constitutes no part of this invention.

At the top of the frame is a casing 23 for carrying part of the transmission gearing and from this extends the vertical spindle 24 which moves up and down with a sliding head 25 and carries a multiple head 26 for a plurality of drills or other tools. It will be understood, of course, that the head 25 is counterbalanced by a weight inside the frame preferably hung on a chain or cable 40.

For the purpose of moving the sliding head 25 up and down at two different speeds the frame 10 is provided with a rack 27 with which meshes a pinion 28 fixed on a stud rotating in the head 25 as shown in Fig. 10. This pinion meshes with a pinion 29 on a shaft 30 which carries two gears 31 and 32. Mounted to slide in bearings on the sliding head 25 is a shaft 33 carrying two gears 34 and 35 of different sizes, one adapted to mesh with the gear 32 when the shaft is in the position shown in Fig. 10 and the other adapted to mesh with the gear 31 when the shaft 33 is pushed in to its other extreme position. For the purpose of operating these parts the shaft 33 is fixed to a hub 36 and on the hub are a pair of rods 37 at right angles to each other for turning the hub and thus rotating the shaft 33 and raising and lowering the head 25 and also for use in pushing the shaft 33 in and out to vary the speed of rotation. These two rods 37 are slidable in the hub so as to bring them out in order to get the desired leverage. They are frictionally held in any position in which they may be placed by means of balls 38 forced against the rods by springs 39.

Commencing now with the power, the method of driving the spindle 24 will now be described.

It has been stated that the pulley 13 is a loose pulley. The other pulley 14 which is shown of slightly larger diameter, is a tight pulley when driving but is not perfectly tight on the shaft. Inside it a disk 41 is keyed to the shaft and on the hub 42 of this disk is loosely mounted the driving pulley 14. The disk is provided with a projection 43 which extends into an arcuate slot 44 in the web of the pulley 14. Between this projection and the end of the slot is a spring 45 held in place in a convenient manner and operating to receive the first shock when starting up the driving pulley but more especially when changing the speed as will appear hereinafter.

The main power shaft 12 to which the disk 41 is fixed is hollow at its inner end and is provided with a slide 46 movable longitudinally therein. For the purpose of operating this slide it has a series of grooves 47 on its inner end with which meshes a segmental gear 48. This gear is on a shaft 49 and is oscillated for the purpose of moving the slide 46 in the shaft 12 so as to change the speed as will appear. This movement can be made by a foot treadle 50 or a lever 51 as desired. The lever is fixed directly to the shaft and the treadle is connected by links 52 to the shaft or to the lever. For the purpose of holding the segmental gear 48 and its operated parts in any fixed position, the lever 51 is provided with a spring-pressed pin 53 and the frame is provided with a plate 54 having a series of shallow sockets 55 for receiving the pin and frictionally holding the parts in their adjusted positions. This also serves to show the operator when he has got the slide in any one of its proper positions for transmitting the power.

The slide 46 which moves longitudinally in the shaft 12 is provided with a key 56 having a locking projection 57 for engaging in the keyways 58 of any one of a series of gears 59 which are loosely mounted on the shaft 12 so as to transmit power to these gears. These gears are provided with rings 59ª separating their several keyways from each other and having conical surfaces so that the key will be positively forced out of one keyway before it can enter the next one as is usual in this class of transmissions. The spring 60 is supplied for the usual purpose.

A new feature of this change speed device consists in the provision of means whereby the key is positively prevented from being forced out of the keyway of any gear in the absence of longitudinal motion of the slide. It has been found in practice that at the high speeds and under the severe conditions now required these keys are sometimes forced out of their keyways back into the slide and this part of the invention is designed to prevent that absolutely. For this purpose the shaft 12 is provided with a series of projections 61 each in position to receive a projection 62 on the rear of the key 56 and lock it in its extreme position in the slot after the key has moved to the center of the slot. The projection 62 extends through a perforation in the slide for this purpose and these projections 61 are spaced apart so as to come at the middle of each of the several gears. When in this locking position it is obvious that the key cannot be forced out unless the slide is moved longitudinally. This key according to the position of the segmental gear 48 controls the transmission of power from the main power shaft 12 to the several gears 59 rotatably mounted thereon. There are several of these gears the function of which is simply to transmit power to an intermediate shaft 64 through a series of gears 65 at a plurality of different speeds. The gear 59c which transmits power to one of the gears 65ª at the lowest speed and meshes directly with it is not loose on the shaft 12 like the other gears but is keyed directly to it as shown in Fig. 6, when the machine is used for drilling only. The gear 65ª to which it is connected is made loose on a disk 66 which is keyed to the shaft 64.

This disk is provided with a reëntrant notch 67 having a chordal side on which rests a roll 68. A spring 69 is provided to keep this roll in contact with the interior cylindrical surface of the gear itself.

It will be obvious that when the gear 590 is driven forward, which is the only way in which it can be driven, and the other gears are out of positive engagement with the shaft 12, it will transmit power through this roll crowding into the small edge of the notch. However when the shaft 64 is driven at a higher speed by one of the other gears 59 on the shaft 12 being positively connected therewith, this roll will be moved up against the spring and will not retard or interfere with the action of the shaft 64. The purpose of this construction is to provide a constant low speed rotation for the shaft 64 while the machine is running instead of throwing out all of the gears and letting this shaft stop. In this way it will be seen that when the speeds are changed the speed of rotation of this shaft 64 simply increases from the normal low speed due to this gearing to the higher speed required. Consequently there is a smaller amount of change and therefore of shock. This feature coöperates with the spring cushioning device 45 to lessen the shock of changing speed.

It will be observed that the construction, as so far described, of the driving pulleys and transmission is such as to provide for the smallest possible chances of the speed changes resulting in noise or unnecessary vibration. However, these devices would not be absolutely sufficient for this purpose with the ordinary forms of gearing for the reason that the gearing itself would make so much noise. In order to carry forward this idea I have provided the shaft 64 with a spiral gear 72 meshing with a spiral gear or pinion 73 on a shaft 74 (Figs. 4 and 9) which in turn has a spiral gear 75 meshing with a smaller spiral gear 76 on a horizontal shaft 77. This shaft and these gears are located in the casing 23 at the top of the frame and run in oil. On its other end it is provided with a spiral gear 78 meshing with a similar spiral gear 79 which is splined to permit of the rising and falling of the tool spindle 24 which passes therethrough and is driven thereby. This spindle, as has been indicated before, passes down through the sliding head 25 and is provided with the multiple head 26 for receiving a plurality of tools such as drills and taps in a manner substantially the same as that indicated in my above identified patent. However, for the purpose of permitting these tools in the tool holders to be accurately and firmly centered on the spindle when they are swung around into operative position at the bottom, the inside of the head 26 is provided with cam surfaces 80. The swinging arms or holders 81 which carry the collets 82, which connect the tools with the power, are provided with freely turning cylinders 83. Each cylinder has cam projections 84 adapted to be moved along the cam surfaces 80 and positively fix the same thereto so that the tool will be rotated positively and cannot vibrate or work loose. The cylinders are turned by hand to tighten these cam surfaces.

In this way a firm, noiseless and shockless drive is secured all the way from the driving belt to the drill which it is operating, and the parts are within easy control of the operator who can raise and lower the sliding head 24 by the mechanism shown in Fig. 10 and can control the driving gear by the means herein illustrated.

Although I have shown and described only a single embodiment of the invention I am aware of the fact that many modifications can be made therein by any person skilled in the art without departing from the scope of the invention as expressed in the claims. Therefore, I do not wish to be limited to all the details of construction herein shown and described, but What I do claim is:—

1. The combination with a driving shaft, of a series of change speed gears on said driving shaft, a driven shaft, a corresponding series of change speed gears on the driven shaft constantly meshing with the gears on the driving shaft, said gears on the driven shaft except the largest one being fixed thereto, means for connecting any one of the gears on the driving shaft except the smallest one with said shaft and disconnecting them therefrom, a disk fitting in the largest of said gears on the driven shaft and keyed to the driven shaft, said disk having a chordal slot in its circumference, and a roll in said slot adapted to contact with the inner surface of the gear in which the disk is located, whereby when none of the other gears is connected with the driving shaft, the disk will be driven by its gear, and consequently the driven shaft will be actuated at its lowest speed, but when one of the other gears is connected with the driven shaft the driven shaft will be driven at a higher speed and the said largest gear on the driven shaft will rotate idly.

2. The combination with a driving shaft, a driven shaft, and a series of change speed gears arranged in pairs for connecting said shafts, the gears on one of said shafts being keyed thereto, and the gears on the other shaft being loose, of a sliding key in the latter shaft for connecting the loose gears thereto, said sliding key being provided with a projection on the side opposite its key proper, and the shaft having a series of projections on the key located within said gears for engaging said projection when the key is in position to lock a gear to the shaft and locking the key in said position.

3. The combination with a driving shaft, a driven shaft, and a series of change speed gears therefor, one set of gears being keyed to one shaft and another set being loose on the other shaft, of a sliding key for fixing any one of said loose gears to its shaft, and means carried by the last named shaft for forcing said key into each of the positions in which it locks a gear thereto and for locking said key in its locking position.

In testimony whereof I have hereunto set my hand, in the presence of two subscribing witnesses.

GEORGE P. TAYLOR.

Witnesses:
ALBERT E. FAY,
C. FORREST WESSON.

Copies of this patent may be obtained for five cents each, by addressing the "Commissioner of Patents, Washington, D. C."